United States Patent
Aubin-Marchand et al.

(10) Patent No.: US 12,442,156 B2
(45) Date of Patent: *Oct. 14, 2025

(54) IMPLEMENT MOUNTING ASSEMBLY AND METHOD FOR MANAGING A CABLE USED FOR MOUNTING THE SAME TO A VEHICLE

(71) Applicant: SOUCY INTERNATIONAL INC., Drummondville (CA)

(72) Inventors: Jeremie Aubin-Marchand, St-Hugues (CA); Karen Provencher, Drummondville (CA); Normand Roy, St-Hugues (CA); Michael Bergeron, Drummondville (CA); Yan Roger, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 1128 days.

This patent is subject to a terminal disclaimer.

(21) Appl. No.: 17/374,181

(22) Filed: Jul. 13, 2021

(65) Prior Publication Data

US 2021/0340721 A1  Nov. 4, 2021

Related U.S. Application Data

(63) Continuation of application No. 16/790,448, filed on Feb. 13, 2020, now Pat. No. 11,091,897, which is a (Continued)

(51) Int. Cl.
*B66D 1/36* (2006.01)
*E02F 3/76* (2006.01)
*E01H 5/06* (2006.01)

(52) U.S. Cl.
CPC .............. *E02F 3/7622* (2013.01); *E02F 3/76* (2013.01); *E01H 5/061* (2013.01)

(58) Field of Classification Search
CPC .......... E02F 3/76; E02F 3/7622; E01H 5/061; B66D 1/36
See application file for complete search history.

(56) References Cited

U.S. PATENT DOCUMENTS 4,615,130 A   10/1986 Racicot
4,687,407 A    8/1987 Osborne
(Continued)

*Primary Examiner* — Claude J Brown
(74) *Attorney, Agent, or Firm* — BCF LLP

(57) ABSTRACT

The present technology generally relates to an auto-release cable management assembly for operating a work implement mountable to an implement mounting assembly of a vehicle, the auto-release cable management assembly comprising: a mounting structure connectable to the implement mounting assembly; the mounting structure forming a first underside guide surface for guiding a retractable cable operatively connectable to the vehicle; a hook connected to the mounting structure and suitable for retaining the retractable cable; a gate structured and positioned with respect to the hook to be movable between an open position in which the hook is accessible to the retractable cable, and a closed position in which the hook is inaccessible to the retractable cable; and a guide forming a second underside guide surface for guiding the retractable cable towards the hook and the gate.

18 Claims, 18 Drawing Sheets

Related U.S. Application Data continuation of application No. 15/839,988, filed on Dec. 13, 2017, now Pat. No. 10,597,847.

(60) Provisional application No. 62/433,674, filed on Dec. 13, 2016.

(56) References Cited

U.S. PATENT DOCUMENTS

| | | | |
|---|---|---|---|
| 4,825,570 A | 5/1989 | Schmid et al. | |
| 4,929,007 A | 5/1990 | Bartczak et al. | |
| 4,991,323 A | 2/1991 | Benkler | |
| 5,924,223 A | 7/1999 | Hone | |
| 6,151,808 A | 11/2000 | Curtis | |
| 6,178,669 B1 | 1/2001 | Quenzi et al. | |
| 6,276,076 B1 | 8/2001 | Quenzi et al. | |
| 6,295,892 B1 * | 10/2001 | Roy | G05G 5/06 74/532 |
| 6,334,269 B1 | 1/2002 | Dilks | |
| 6,964,121 B2 * | 11/2005 | Harris | E02F 3/7627 37/231 |
| 8,381,422 B2 | 2/2013 | Hill | |
| 8,646,545 B1 | 2/2014 | Elliott | |
| 8,656,615 B1 | 2/2014 | Fournier et al. | |
| 8,763,280 B1 | 7/2014 | Fournier et al. | |
| 8,827,002 B2 * | 9/2014 | Warchola | E01H 5/06 37/219 |
| 9,051,700 B2 | 6/2015 | Summers et al. | |
| 9,145,096 B2 | 9/2015 | Werthauser | |
| 9,145,915 B2 | 9/2015 | Coulombe et al. | |
| 9,238,894 B1 | 1/2016 | Campos et al. | |
| 9,347,199 B2 | 5/2016 | Gendron et al. | |
| 9,869,067 B2 | 1/2018 | Barker et al. | |
| 10,486,616 B2 * | 11/2019 | Lauziere | B60R 11/06 |
| 10,595,453 B2 | 3/2020 | Woelfle et al. | |
| 2002/0014027 A1 | 2/2002 | Robitaille | |
| 2004/0144002 A1 * | 7/2004 | Baker | E01H 5/06 37/266 |
| 2004/0148811 A1 | 8/2004 | Harris | |
| 2005/0206126 A1 | 9/2005 | Harris | |
| 2007/0084089 A1 * | 4/2007 | Shoemaker | E01H 5/06 37/231 |
| 2007/0101620 A1 | 5/2007 | Roy | |
| 2007/0187118 A1 * | 8/2007 | Belanger | E01H 5/06 172/1 |
| 2008/0222925 A1 | 9/2008 | Belzile et al. | |
| 2011/0168417 A1 | 7/2011 | Benesch | |
| 2012/0138881 A1 | 6/2012 | Elliott et al. | |
| 2012/0187263 A1 | 7/2012 | Coulombe et al. | |
| 2012/0267133 A1 | 10/2012 | Hill | |
| 2016/0289915 A1 | 10/2016 | Lauziere et al. | |

* cited by examiner

IMPLEMENT MOUNTING ASSEMBLY AND METHOD FOR MANAGING A CABLE USED FOR MOUNTING THE SAME TO A VEHICLE

CROSS-REFERENCE TO RELATED APPLICATIONS

The present application is a Continuation application of U.S. patent application Ser. No. 16/790,448, filed on Feb. 13, 2020, which is a Continuation application of U.S. patent application Ser. No. 15/839,988, filed Dec. 13, 2017, entitled "Auto release cable system and method of using the same". Through the U.S. patent application Ser. No. 15/839,988, the present application claims priority to U.S. Provisional Patent Application Ser. No. 62/433,674, filed Dec. 13, 2016, entitled "Auto release cable system and method of using the same". All of the above-mentioned patent applications are incorporated by reference herein in their entirety.

TECHNICAL FIELD

The present technology relates to an implement mounting assembly for mounting a work implement to a vehicle, and more particularly the present technology relates to an implement mounting assembly having an auto-release cable management assembly.

BACKGROUND

All-terrain vehicles ("ATV" or "ATVs"), utility-terrain vehicle ("UTV" or "UTVs"), side-by-side vehicles ("SSV" or "SSVs") and other similar vehicles are often equipped with a work implement to perform utilitarian work. For example, a snow plow can be mounted to such vehicles for displacing snow, dirt, gravel, soil, etc. The work implement is typically removably mounted to the frame of the vehicle via an implement mounting assembly.

Although several different configurations of implement mounting assemblies have been available on the market, most implement mounting assemblies can be categorized either as front-mounted (i.e. mounted to the front of the frame of the vehicle) or as underside-mounted (i.e. mounted to the underside of the frame of the vehicle). In most cases, both front-mounted and underside-mounted implement mounting assemblies are mounted to the frame of the vehicle after having been positioned (with respect to the frame) using a retractable cable and a winch that is mounted to the vehicle and operated by a user. To position the implement mounting assembly so as to be mounted to the vehicle, the user first attaches the cable to an attachment point provided on the implement mounting assembly. Then the user operates the winch to retract the cable and lift the implement mounting assembly off the ground (and, if necessary, moves the vehicle to position the implement mounting assembly with respect to the frame mounts). After the implement mounting assembly has been mounted to the frame of the vehicle, the user detaches the cable from the attachment point and attaches the cable to another attachment point of the implement mounting assembly. This permits operation of the implement mounting assembly and the work implement that is mounted thereto using the winch of the vehicle.

Under certain conditions, this procedure for positioning and mounting the implement mounting assembly to the vehicle is cumbersome and time consuming because the user has many steps to perform to position and mount the implement mounting assembly to the vehicle. As well, these steps generally require the user to get on and off the vehicle, and manipulate the cable for attaching and detaching it from different attachment points of the implement mounting assembly.

Therefore, improvements to implement mounting assemblies and to methods for managing the cable used to position, and mount such implement mounting assemblies to a vehicle, are desirable.

SUMMARY

It is therefore an object of the present technology to ameliorate at least one of the inconveniences present in the prior art.

It is also an object of the present invention to provide an implement mounting assembly which is improved in at least some instances as compared with some of the prior art.

In the present specification, the terms "longitudinally" and "longitudinal" mean in a direction parallel to the lengthwise direction of the implement mounting assembly. The terms "laterally" and "lateral" mean in a direction transverse to the longitudinal direction of the implement mounting assembly. The terms "vertically" and "vertical" mean in a direction perpendicular to a plane formed by the longitudinal and lateral directions.

In accordance with one aspect of the present technology, there is provided an implement mounting assembly for mounting a work implement to a vehicle. The implement mounting assembly is mountable to the vehicle after having been positioned using a retractable cable operatively connected to the vehicle. The implement mounting assembly includes a frame having first and second longitudinally extending members. The first and second members each have a work implement support end and a vehicle attachment end. The first and second members are laterally spaced apart. A cable routing space is defined between the first and second members. The implement mounting assembly further includes an attachment point to which the cable extending through the cable routing space is attachable. The attachment point is connected at the work implement support end of at least one of the first and second longitudinally extending members.

The implement mounting assembly further includes an auto-release cable management assembly disposed longitudinally between the attachment point and the vehicle attachment ends of the first and second longitudinally extending members. The auto-release cable management assembly includes a hook supported by the first longitudinally extending member within the cable routing space.

The auto-release cable management assembly further includes a first underside guide surface supported by the first longitudinally extending member within the cable routing space. The first underside guide surface is shaped and positioned with respect to the hook to guide the cable within the cable routing space contacting the first underside guide surface towards the hook as the cable retracts.

The auto-release cable management assembly further includes a second underside guide surface supported by the second longitudinally extending member within the cable routing space. The second underside guide surface is shaped and positioned with respect to the hook to guide the cable within the cable routing space contacting the second underside guide surface towards the hook as the cable retracts.

The auto-release cable management assembly further includes a gate structured and positioned with respect to the hook to be movable between an open position in which the hook is accessible to the cable and a closed position in which the hook is inaccessible to the cable. The gate is biased towards the closed position. The bias in the gate is overcomeable by the cable having a tension above a threshold tension.

When the implement mounting assembly is on a ground surface, the cable extends from the vehicle through the cable routing space underneath the auto-release cable management assembly, the cable is attached to the attachment point, and the cable is retracted; the cable is guided by at least one of the first underside guide surface and the second underside guide surface towards the hook, the tension in the cable increases to above the threshold tension overcoming the bias in the gate and moving the gate towards the open position, the cable accesses and is retained by the hook, the work implement mounting assembly is lifted off the ground surface, the tension in the cable decreases to be below the threshold tension, and the gate moves towards the closed position releasing the cable from the hook.

Under certain circumstances, the implement mounting assembly of the present technology permits a user to attach the cable to a single attachment point on the implement mounting assembly for both mounting operations and for use of the assembly of the work implement and implement mounting assembly.

In some embodiments, a center of mass of the implement mounting assembly is located longitudinally between the attachment point and the hook.

In some embodiments, the implement mounting assembly is mountable to the vehicle via an attachment system that is operatively connected to the vehicle attachment end of the frame.

In some embodiments, a center of mass of an assembly of a work implement, the implement mounting assembly, and the attachment system is located longitudinally between the attachment point and the hook. Under certain circumstances, having the center of mass positioned as such permits that the attachment system is lifted off the ground surface by the cable before the work implement, which facilitates the mounting of the assembly to the vehicle.

In some embodiments, the hook is laterally centered between the first and second longitudinally extending members.

In some embodiments, the hook is located vertically higher than the first and second underside guide surfaces.

In some embodiments, the first underside guide surface is inclined between the first longitudinally extending member and the hook, and the second underside guide surface is inclined between the second longitudinally extending member and the hook.

In some embodiments, the hook is part of a mounting structure that is connected to the first longitudinally extending member.

In some embodiments, the first underside guide surface is part of the mounting structure.

In some embodiments, the gate is pivotably mounted to the mounting structure.

In some embodiments, the gate is located longitudinally between the hook and the vehicle attachment end of the first and second longitudinally extending members.

In some embodiments, the gate is spring-loaded.

In some embodiments, the gate has a guide surface that pushes and slides the cable off the hook.

In some embodiments, the cable routing space extends underneath the hook, and the first and second underside guide surfaces.

In some embodiments, the first underside guide surface, the hook and the second underside guide surface laterally span the cable routing space entirely.

In some embodiments, the second underside guide surface is part of a guide that is connected to the second longitudinal member. In some embodiments, the guide is resiliently movable when the cable engages the second underside guide surface. In some embodiments, the guide has a free end extending below the hook, and the free end is movable for abutting on the hook when the cable engages the second underside guide surface.

In some embodiments, the free end of the guide is distanced from the hook when the cable engages the hook or the first underside guide surface.

In accordance with another aspect of the present technology, there is provided a method for managing a retractable cable used for mounting an implement mounting assembly to a vehicle from a ground surface. The method includes routing the cable from the vehicle through a cable routing space extending underneath a hook of the implement mounting assembly while the implement mounting assembly is on the ground surface, attaching the cable to an attachment point of the implement mounting assembly that is located longitudinally past the hook, retracting the cable towards the vehicle with a tension that is higher than a threshold tension so that the cable is guided towards the hook, accesses and is retained by the hook, the cable causing the lifting of the implement mounting assembly off the ground surface, and extending the cable away from the vehicle so as to decrease the tension in the cable below the threshold tension and simultaneously releasing the cable from the hook.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 1:
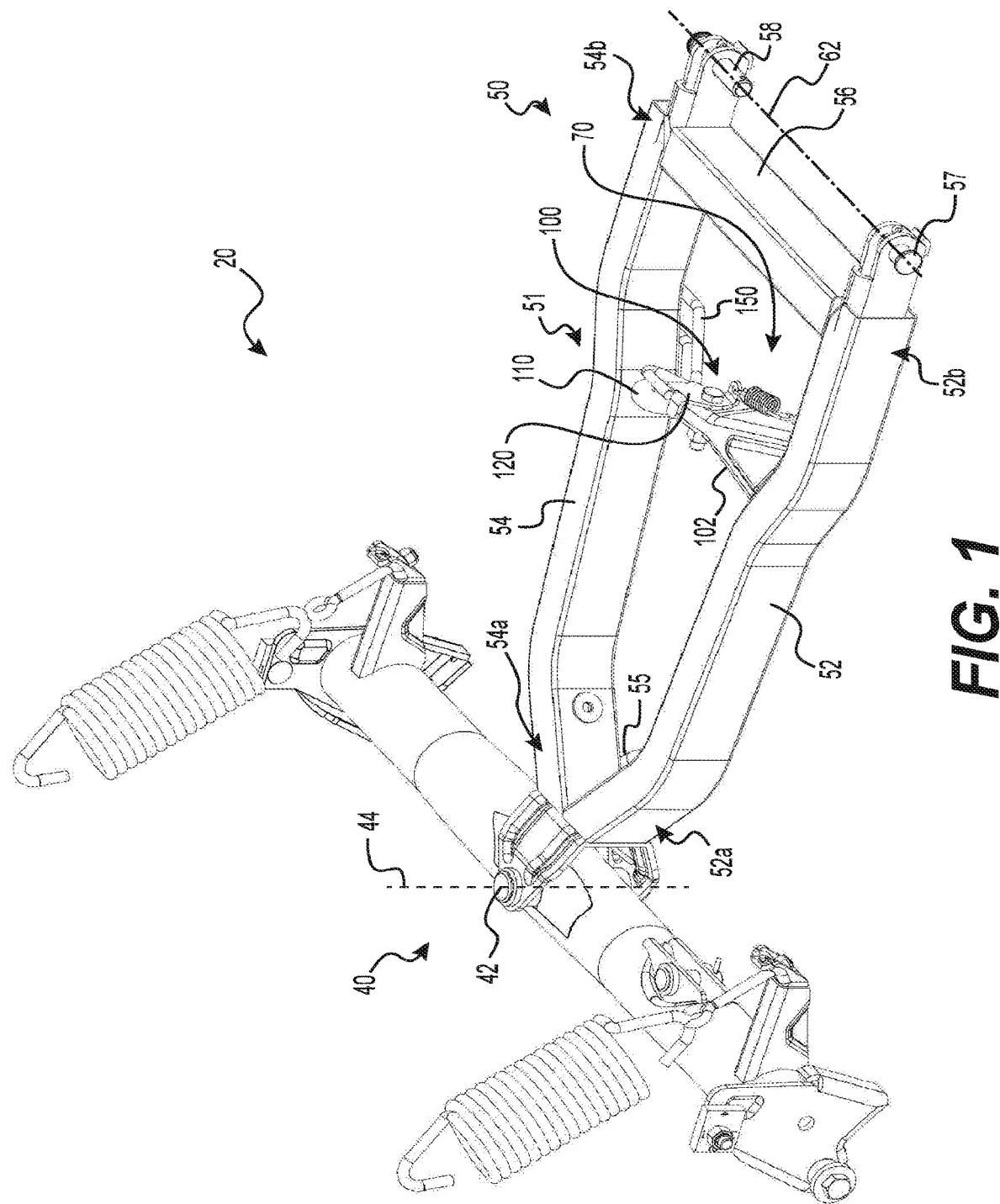
FIG. 1 is a perspective view taken from a top, rear, left side of an implement mounting assembly in accordance with an embodiment of the present technology.

In accordance with an aspect of the present technology and with reference to the accompanying FIGS. 1 to 17, an implement mounting assembly 20 according to an embodiment of the present technology will be described. It should be understood that the implement mounting assembly 20 is merely an embodiment of the present technology. Thus, the description thereof that follows is intended to be only a description of illustrative examples of the present technology. This description is not intended to define the scope or set forth the bounds of the present technology.

Examples of modifications or alternatives to the implement mounting assembly 20 are described below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e. where no examples of modifications have been set forth), it should not be interpreted that no modifications are possible and/or that what is described is the sole manner of implementing or embodying that element of the present technology.

In addition, it is to be understood that the implement mounting assembly 20 may provide in certain aspects a simple embodiment of the present technology, and that where such is the case it has been presented in this manner as an aid to understanding. As persons skilled in the art would understand, various embodiments of the present technology may be of a greater complexity than what is described herein.

General Description of the Implement Mounting Assembly

Referring to FIGS. 1 to 6, the implement mounting assembly 20 is structured and arranged to be removably mounted to a vehicle 30 (shown in FIGS. 5 and 6) so as to removably mount a work implement 22 to the vehicle 30. The vehicle 30 has a frame 32 including mounts 34 that are located at a forward portion of the frame 32 and between the front wheels 36 (only the right wheel is shown in the Figures). The mounts 34 that are illustrated in the Figures are laterally extending rods, but they could be shaped or structured otherwise in other embodiments. In the accompanying Figures, the vehicle 30 is an all-terrain vehicle ("ATV"), but the implement mounting assembly 20 could be structured and arranged to be removably mounted to a utility-terrain vehicle ("UTV"), a side-by-side vehicle ("SSV") or any other type of utilitarian vehicle (of similar size and purpose). Furthermore, the work implement 22 illustrated in the Figures is a snow plow, but other work implements 22 could be mounted to the implement mounting assembly 20.

Figure 2:
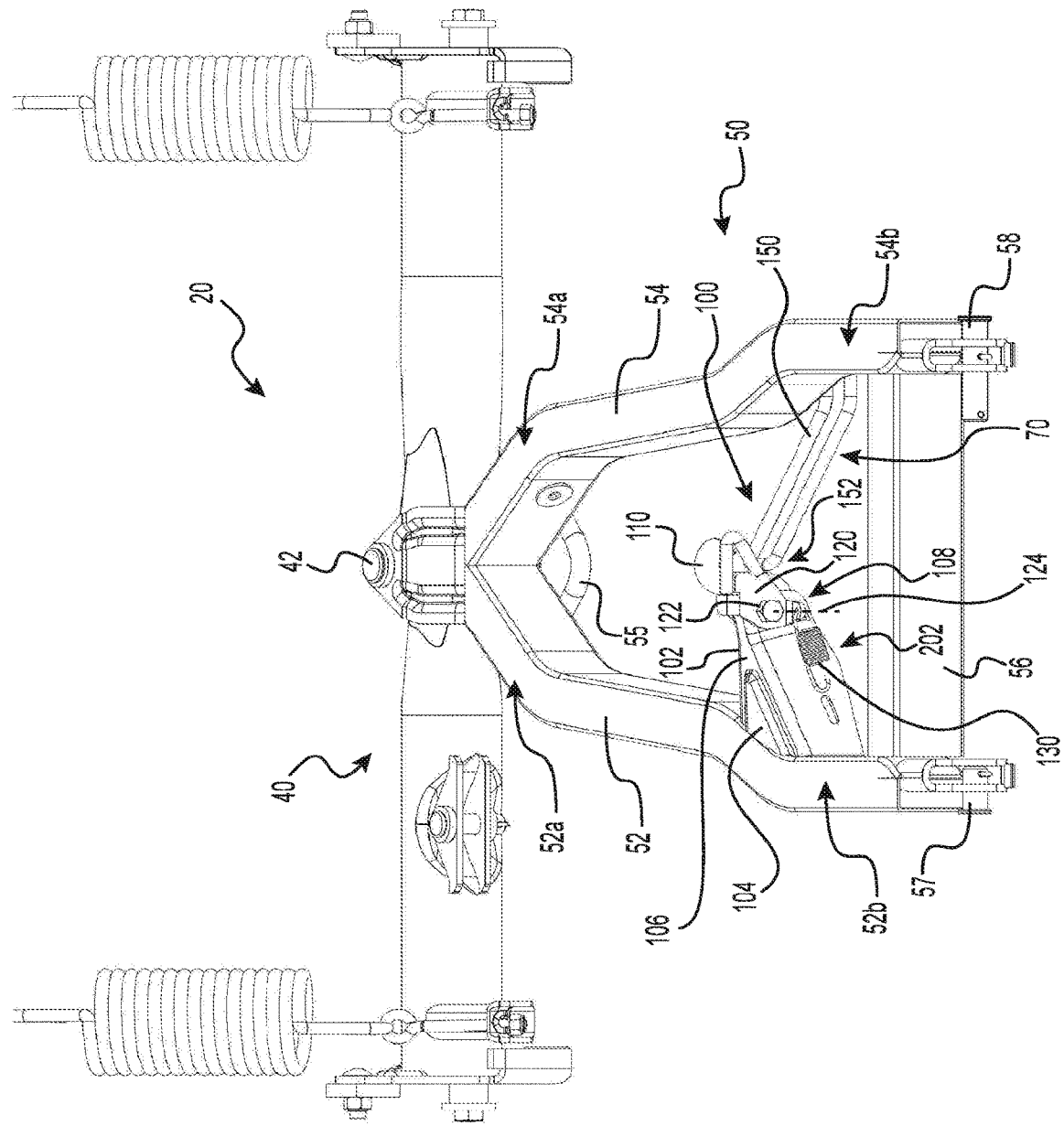
FIG. 2 is a perspective view taken from a top, rear side of the implement mounting assembly of FIG. 1.
Figure 3:
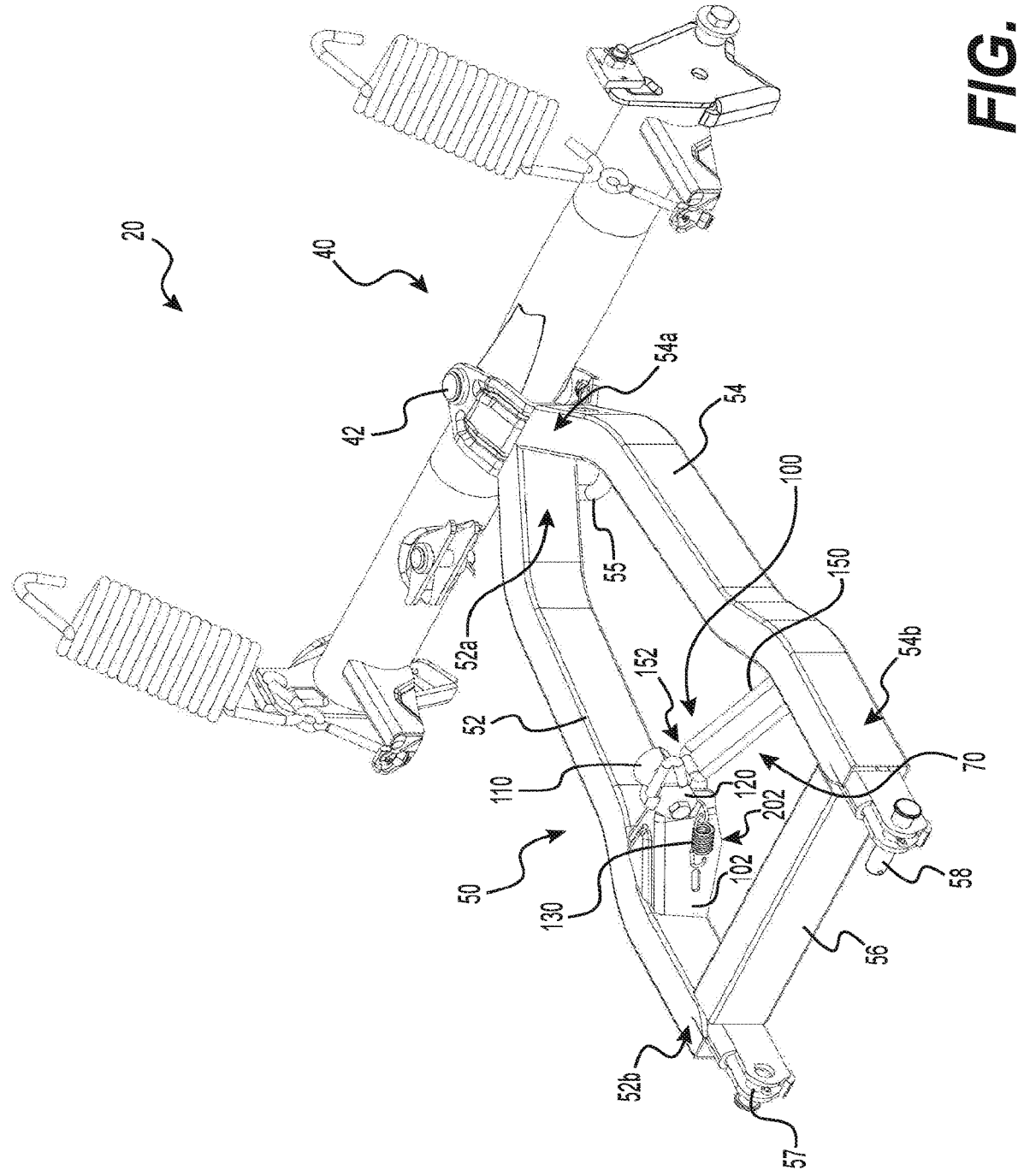
FIG. 3 is a perspective view taken from a top, rear, right side of the implement mounting assembly of FIG. 1.

Still referring to FIGS. 1 to 6, the implement mounting assembly 20 has a front portion 40 and a rear portion 50. The front portion 40 extends laterally and supports the work implement 22. The front portion 40 is pivotably connected to the rear portion 50 at a pivot 42. The front portion 40 can thus pivot with respect to the rear portion 50 about a pivot axis 44 so as to orient the work implement 22 in a desired angle. The rear portion 50 has a frame 51 including left and right longitudinally extending members 52, 54. The left longitudinally extending member 52 has a work implement support end 52a, and the right longitudinally extending member 54 has a work implement support end 54a. The work implement support ends 52a, 54a are joined together and support the pivot 42. The left longitudinally extending member 52 has a vehicle attachment end 52b, and the right longitudinally extending member 54 has a vehicle attachment end 54b. The vehicle attachment ends 52b, 54b are laterally spaced apart. As best seen in FIG. 2, the longitudinal members 52, 54 provide the rear portion 50 with a generally V-shape. A cable routing space 70 is defined between the longitudinal members 52, 54.

Figure 4:
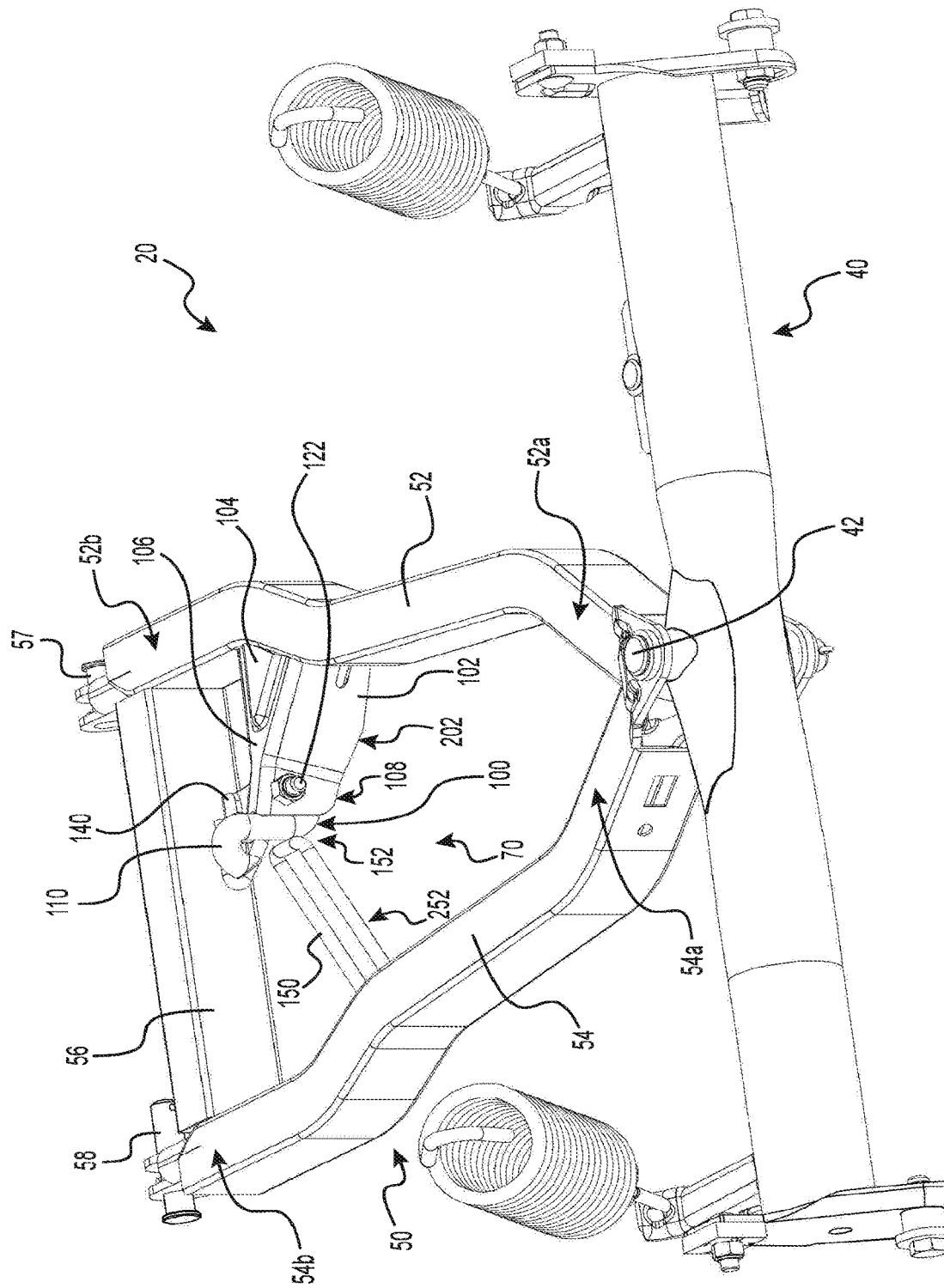
FIG. 4 is a perspective view taken from a top, front, right side of the implement mounting assembly of FIG. 1.
Figure 5:
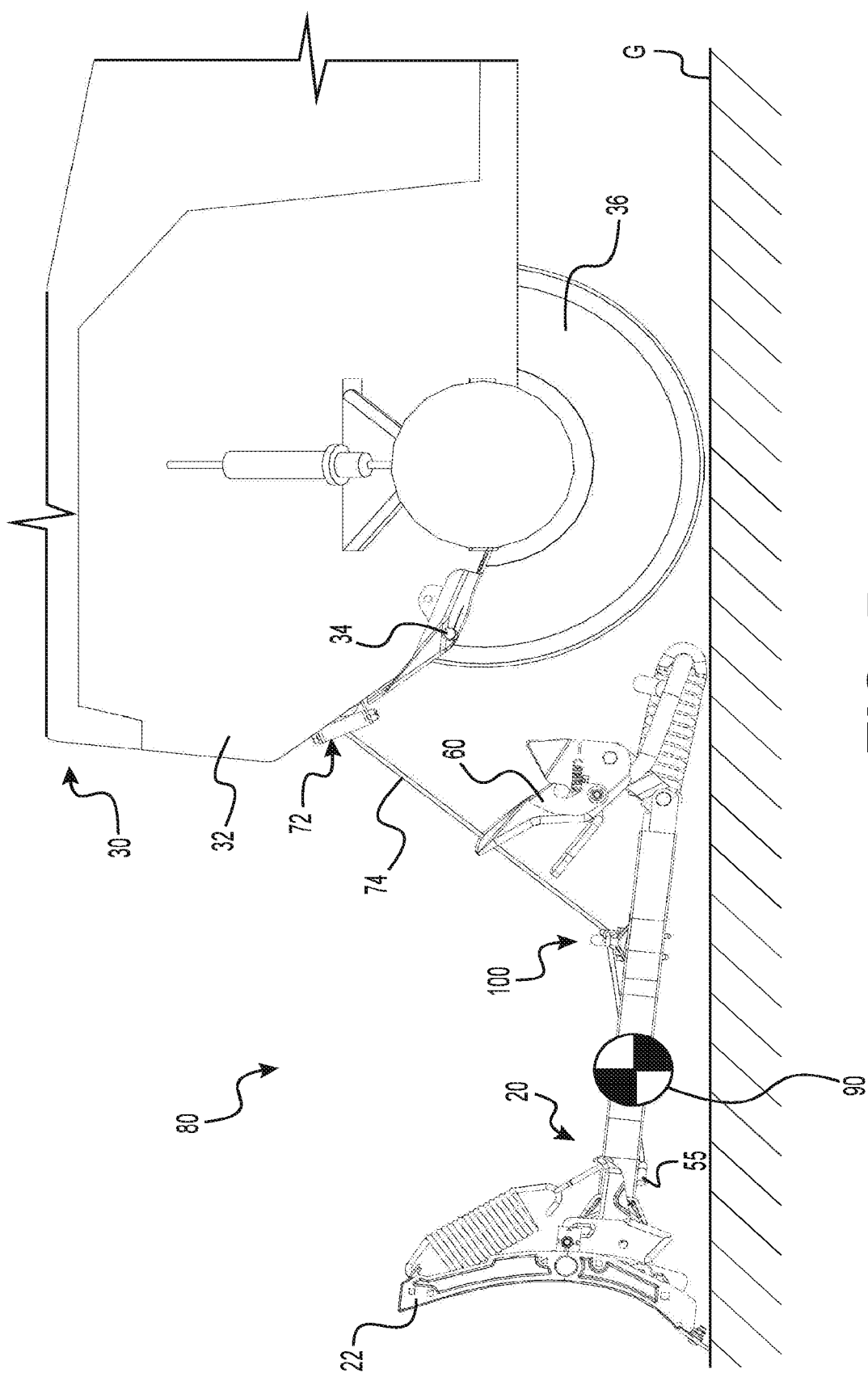
FIG. 5 is a left side elevation view of the implement mounting assembly of FIG. 1, with a snow plow and an attachment system mounted to the implement mounting assembly and a vehicle to which the implement mounting assembly is about to be mounted using a winch and cable of the vehicle and the attachment system, with the left front wheel of the vehicle removed.
Figure 6:
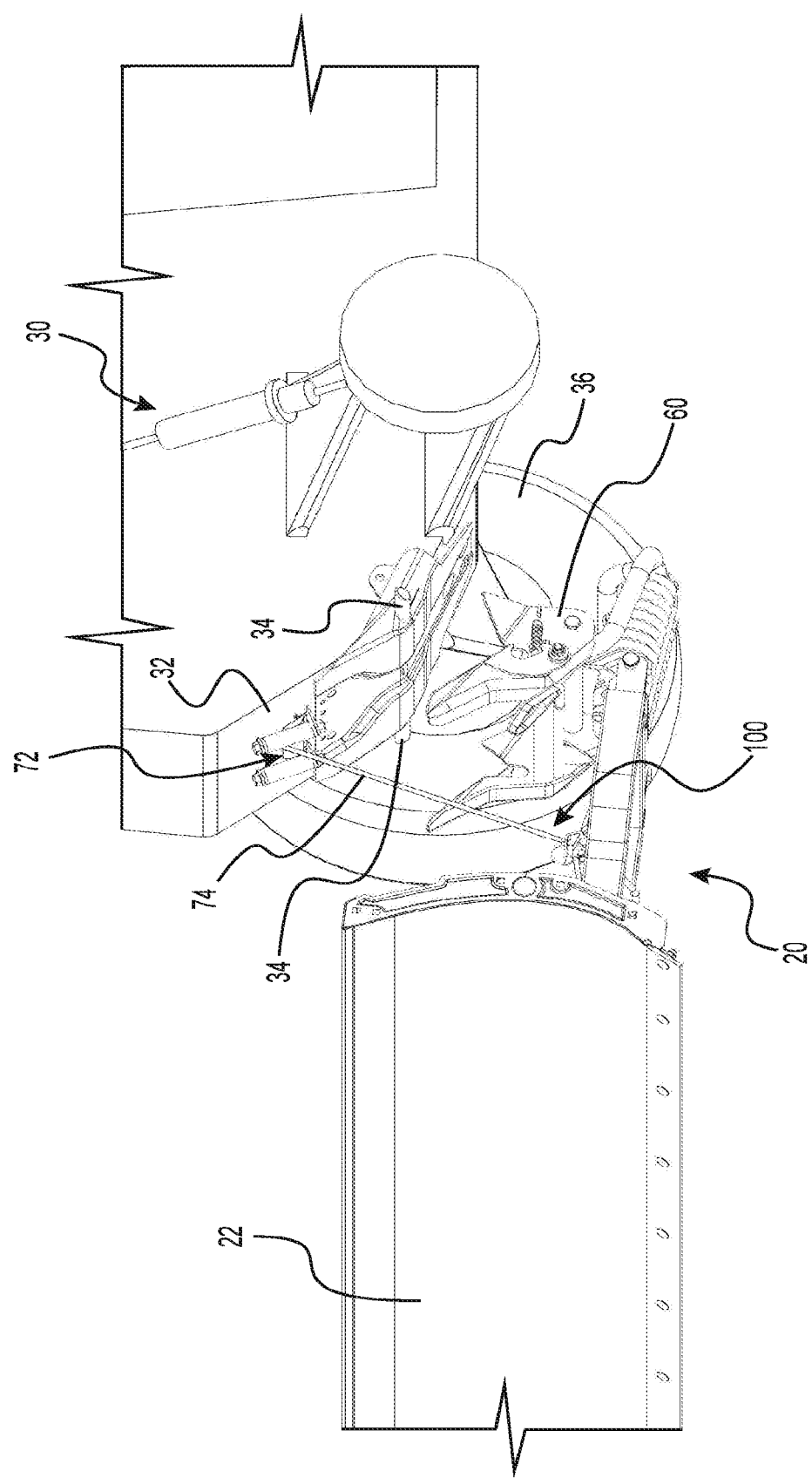
FIG. 6 is a perspective view taken from a front, left side of the implement mounting assembly, snow plow, attachment system and vehicle of FIG. 5.

Still referring to FIGS. 1 to 6, an attachment point 55 is connected on a bottom face of the longitudinal members 52, 54, at the work implement ends 52a, 54a thereof. In the present embodiment, the attachment point 55 is a catch. In other embodiments, the attachment point 55 could be connected to only one of the left and right longitudinal members 52, 54. A transverse member 56 extends laterally between the vehicle attachment ends 52b, 54b of the longitudinal members 52, 54. The rear portion 50 of the implement mounting assembly 20 also includes an auto-release cable management assembly 100 that will be described in detail below. The rear portion 50 further includes latches 57, 58 that are connected to the vehicle attachment ends 52b, 54b. The latches 57, 58 are used to mount the implement mounting assembly 20 to an attachment system 60 (FIGS. 5 and 6). The attachment system 60 is attachable to the mounts 34 of the frame 32 of the vehicle 30. The action of the attachment system 60 is better seen in FIGS. 12 and 13.

Figure 16:
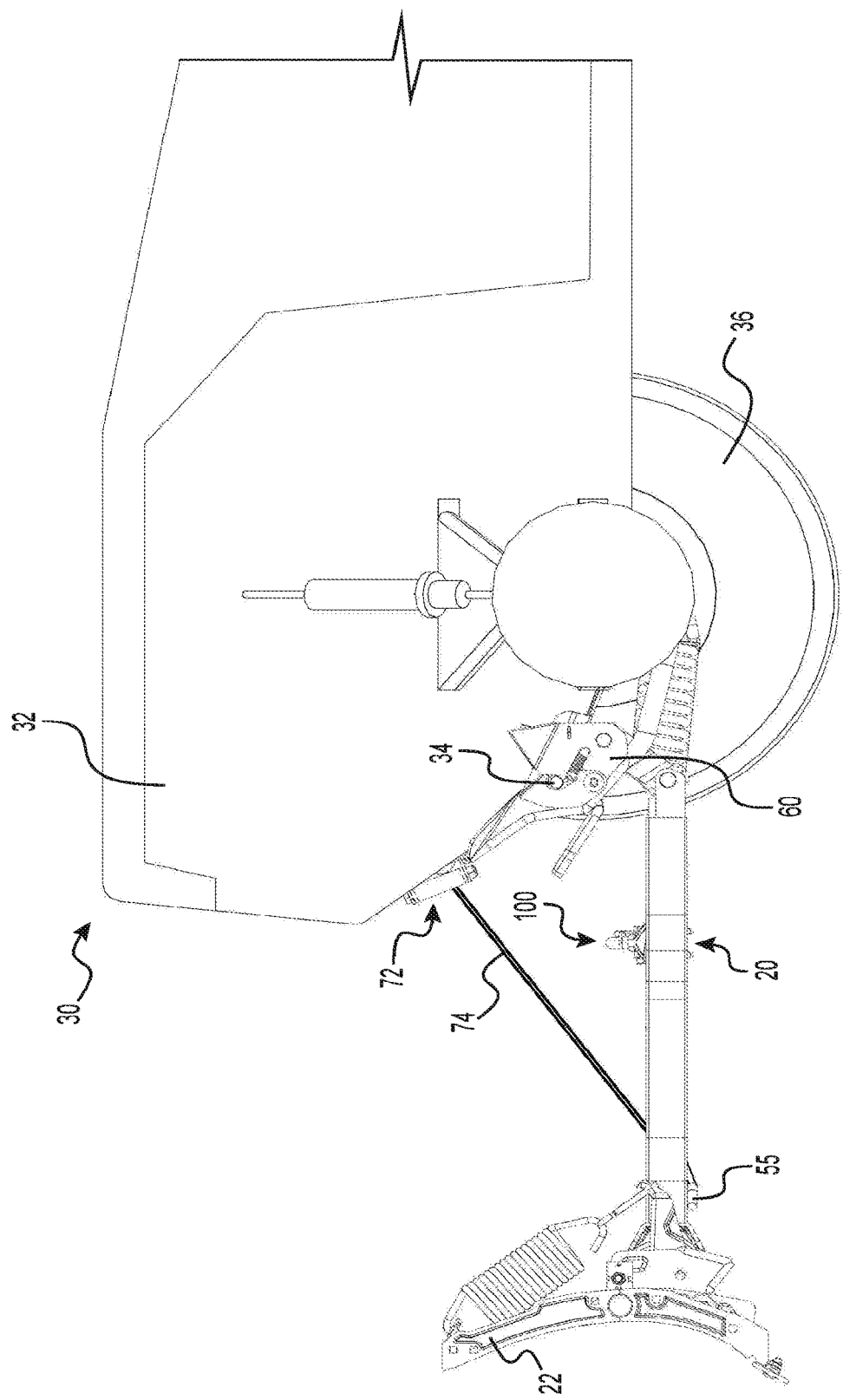
FIG. 16 is a left side elevation view of the implement mounting assembly of FIG. 15, with the cable extending above the auto-release cable management assembly of the implement mounting assembly and with the work implement in a down position.
Figure 17:
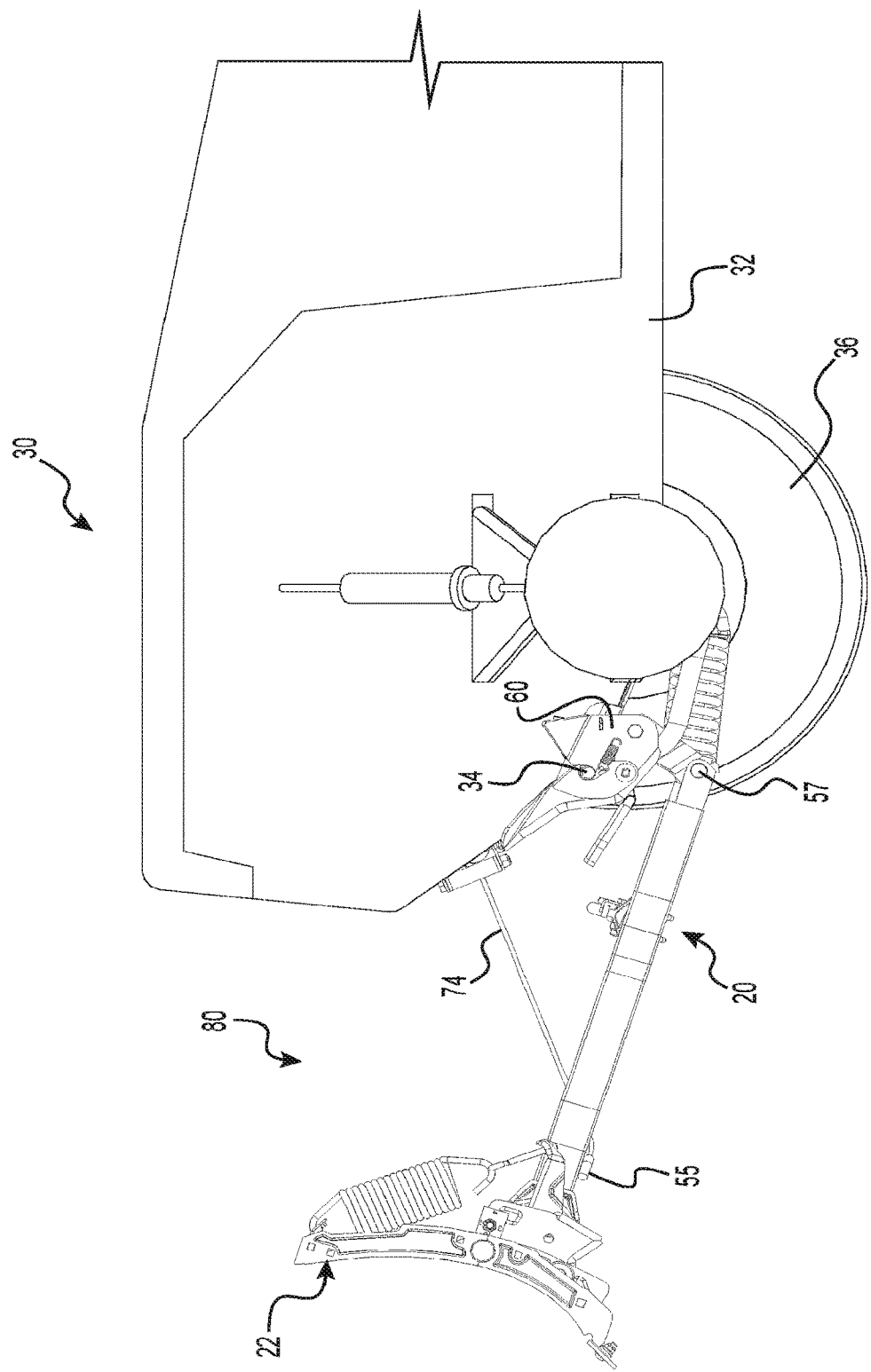
FIG. 17 is a left side elevation view of the implement mounting assembly of FIG. 16, with the cable retracted and with the work implement in an up position.

The implement mounting assembly 20 and the attachment system 60 are structured and arranged to permit the pivot of the implement mounting assembly 20 about an axis 62 defined by the latches 57, 58 (FIGS. 1, 16 and 17). Since the mounts 34 are located in the front portion of the frame 32 of the vehicle 30, the combined implement mounting assembly 20 and attachment system 60 of the present embodiment correspond to a front-mounted implement mounting assembly, but they could be structured and arranged otherwise were the mounts 34 be located on an underside of the frame 32 of the vehicle 30. In other embodiments, the latches 57, 58 could be used to mount the implement mounting assembly 20 directly to the frame 32 of the vehicle 30, without any attachment system 60 or interface therebetween.

Figure 8:
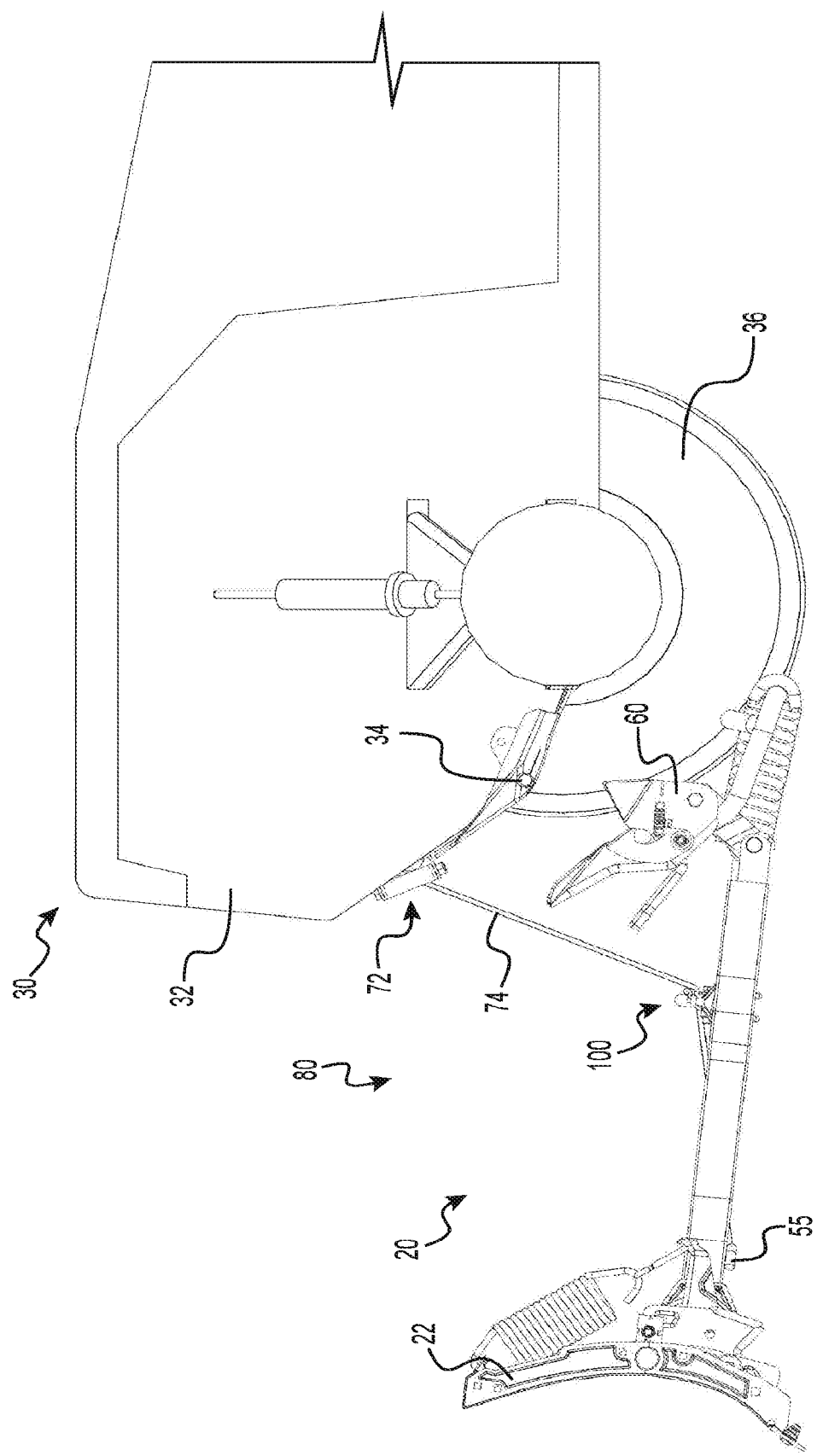
FIG. 8 is a left side elevation view of the implement mounting assembly of FIG. 5, with the vehicle approaching the implement mounting assembly and the cable getting retracted to lift the vehicle attachment ends of the implement mounting assembly off the ground.

Referring to FIGS. 5 and 6, a winch 72 is mounted to the front portion of the frame 32 of the vehicle 30. The winch 72 is located between the front wheels 36 and vertically higher than the mounts 34. The winch 72 can be operated to retract or extend a winch cable 74. The cable 74 is attachable to the catch 55 of the implement mounting assembly 20. Together, the implement mounting assembly 20, the work implement 22 and the attachment system 60 form an assembly 80 (e.g., as can be seen in FIG. 8). As will be described further below, the assembly 80 is positionable with respect to the frame 32 of the vehicle 30 using the winch 72 and the cable 74 so as to be mounted to the frame 32.

Referring to FIGS. 5 and 6, the assembly 80 is laid on a ground surface G, the cable 74 extends from the vehicle 30 through the cable routing space 70 (seen in FIGS. 1 to 4), the cable 74 is attached to the catch 55, and the assembly 80 is about to be positioned to be mounted to the vehicle 30. A center of mass 90 of the implement mounting assembly 20 is represented. It is to be noted that the center of mass 90 is located longitudinally in front of the auto-release cable management assembly 100, but longitudinally to the rear of the catch 55. In the present embodiment, the longitudinal location of the center of mass 90 generally corresponds to the longitudinal location of the center of mass of the assembly 80.

General Description of the Auto-Release Cable Management Assembly

Referring to FIGS. 1 to 4 and 7, the auto-release cable management assembly 100 will be described. The auto-release cable management assembly 100 is disposed longitudinally between the catch 55 and the vehicle attachment ends 52b, 54b of the longitudinal members 52, 54. The auto-release cable management assembly 100 has a support structure 102 that is connected to the left longitudinal member 52 and that extends within the cable routing space 70. The support structure 102 forms an underside guide surface 202 that is within the cable routing space 70.

The auto-release cable management assembly 100 further includes a hook 110 that is connected to the support structure 102. The hook 110 is within the cable routing space 70 and is structured to engage the cable 74.

It is to be noted that the hook 110 is used to position the implement mounting assembly 20, and thus the entire assembly 80, so as to be mounted to the frame 32 of the vehicle 30 when engaged by the cable 74. The catch 55 is used (i) for positioning the implement mounting assembly 20, and thus the entire assembly 80 so as to be mounted to the frame 32, as seen in FIGS. 5, 8, 12 and 13, and (ii) for raising and lowering the work implement 22 using the cable 74 during operation of the assembly 80, as seen in FIGS. 16 and 17.

A gate 120 is operatively connected to the mounting structure 102. The gate 120 is structured and positioned with respect to the hook 110 to be movable between an open position (FIG. 11) in which the hook 110 is accessible to the cable 74, and a closed position (FIG. 14) in which the hook 110 is inaccessible to the cable 74. The gate 120 is biased towards the closed position. The bias in the gate 120 is overcomeable when the cable 74 is attached to the catch 55, extends within the cable routing space 70 and engages the gate 120 with a tension that is above a threshold tension. The bias in the gate 120 is provided by a spring 130 that will be described below.

The auto-release cable management assembly 100 also has a guide 150 that is connected to the right longitudinal member 54. The guide 150 forms an underside guide surface 252 that is within the cable routing space 70. The cable routing space 70 extends underneath the hook 110, and the underside guide surfaces 202, 252. The cable routing space 70 corresponds to the space where the cable 74 has to be routed prior to being attached to the catch 55 so that the cable 74 accesses the hook 110 when the tension in the cable 74 is above the threshold tension.

Figure 10:
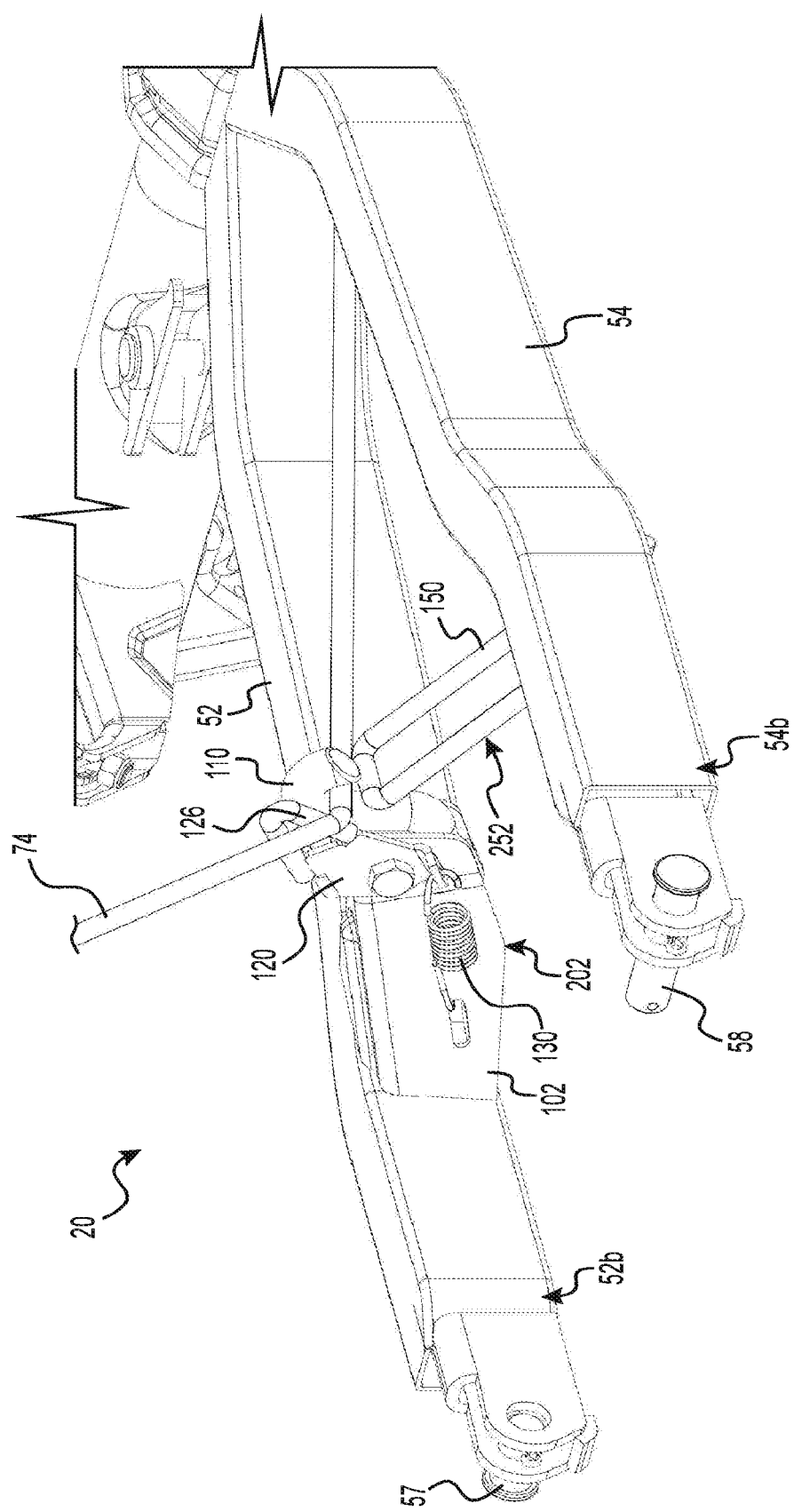
FIG. 10 is a perspective view taken from a top, rear, right side of the implement mounting assembly of FIG. 9, with the cable getting further retracted by the winch and engaging the hook of the auto-release cable management assembly of the implement mounting assembly.
Figure 11:
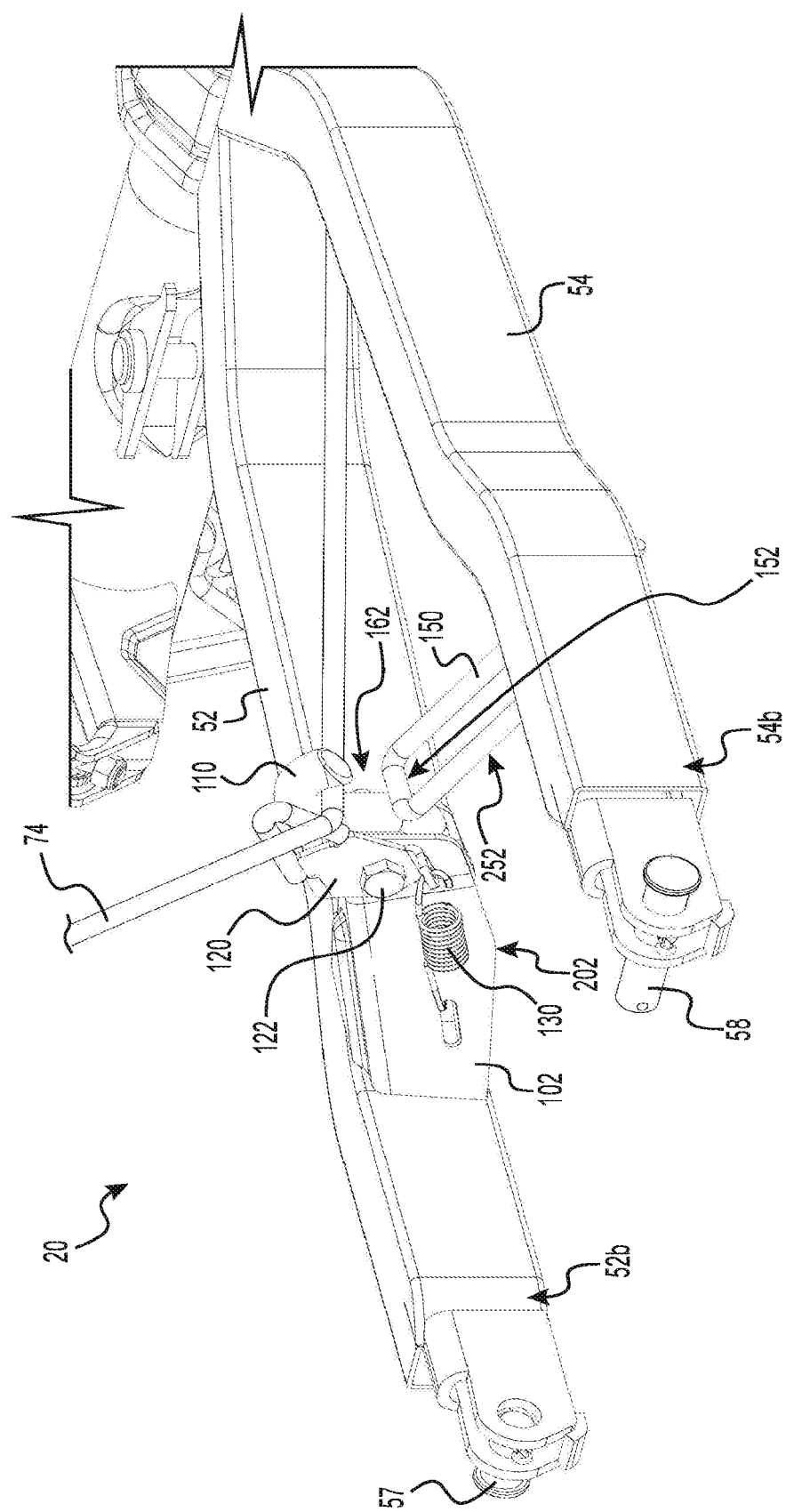
FIG. 11 is a perspective view taken from a top, rear, right side of the implement mounting assembly of FIG. 10, with the guide of the auto-release cable management assembly of the implement mounting assembly reverted to its initial position.
Figure 12:
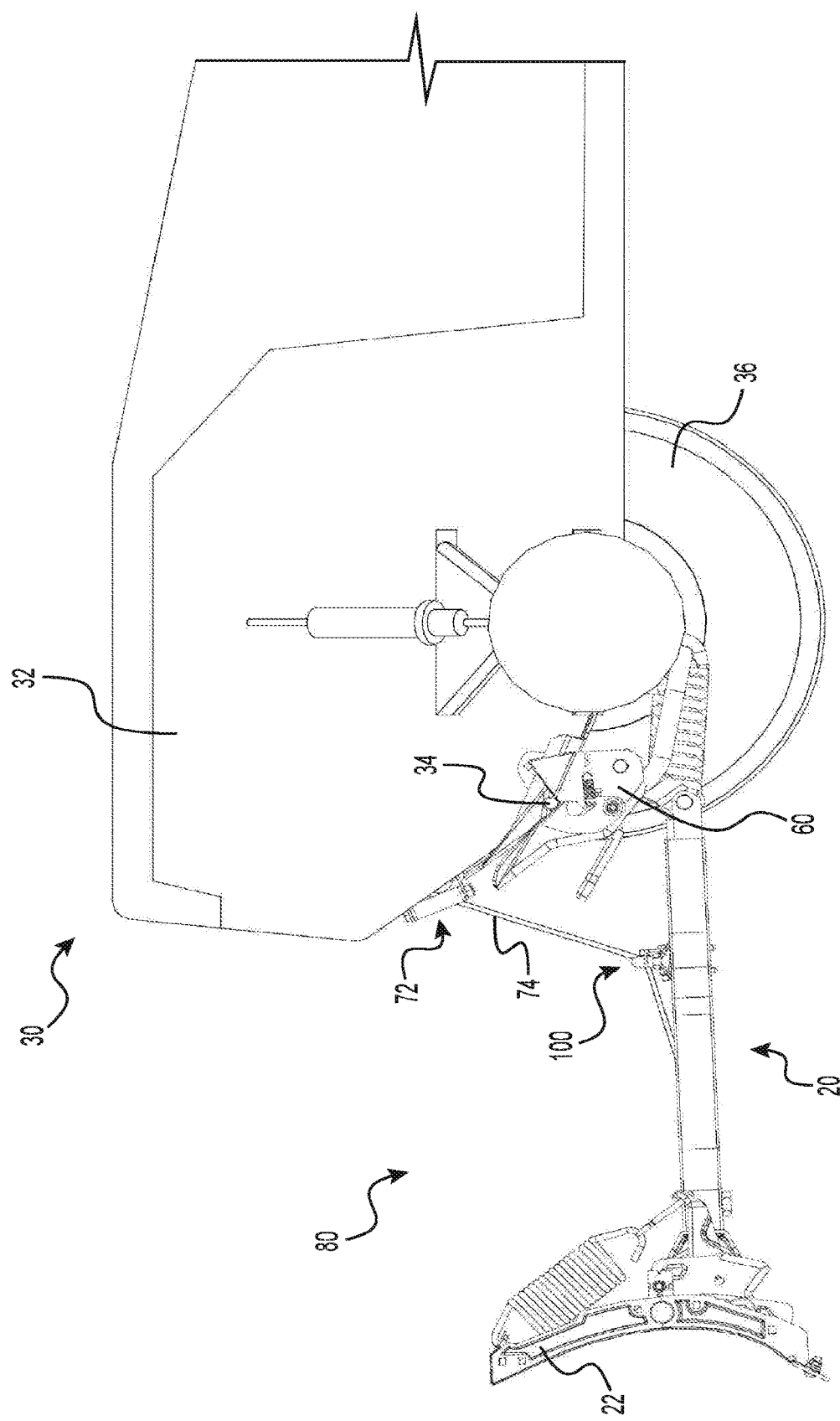
FIG. 12 is a left side elevation view of the implement mounting assembly of FIG. 11, with the implement mounting assembly and the attachment system being lifted by the cable and positioned to be mounted to the frame of the vehicle.

Generally described and with references to FIGS. 7, 9 to 11, 14 and 15, when a user desires to position the implement mounting assembly 20, and thus the entire assembly 80 so as to be mounted to the frame 32 of the vehicle 30, the cable 74 is extended from the winch 72, routed underneath the auto-release cable management assembly 100 within the cable routing space 70, and attached to the catch 55. The user then operates the winch 72 to retract the cable 74. As the cable 74 is retracted by the winch 72, the cable 74 is guided towards the hook 110 by at least one of the underside guide surfaces 202, 252 of the mounting structure 202 and the guide 150 (respectively). As tension increases in the cable 74 above the threshold tension, the cable 74 overcomes the bias in the gate 120 caused by the spring 130, and the cable 74 moves the gate 120 into the open position so as to access and engage the hook 110. As the cable 74 gets further retracted by the winch 72, the cable 74 is retained by the hook 110 and the work implement ends 52b, 54b of the longitudinal members 52, 54 are lifted off the ground surface G. As the cable 74 gets still further retracted by the winch 72, the implement mounting assembly 20, and thus the entire assembly 80, is positioned so that the attachment assembly 60 gets mounted to the mounts 34 of the frame 32 of the vehicle 30. More particularly, when the cable 74 is retracted, the entire assembly 80 pivots about the work implement 22 that is laid on the ground surface G, as seen in FIGS. 5, 8 and 12.

Figure 13:
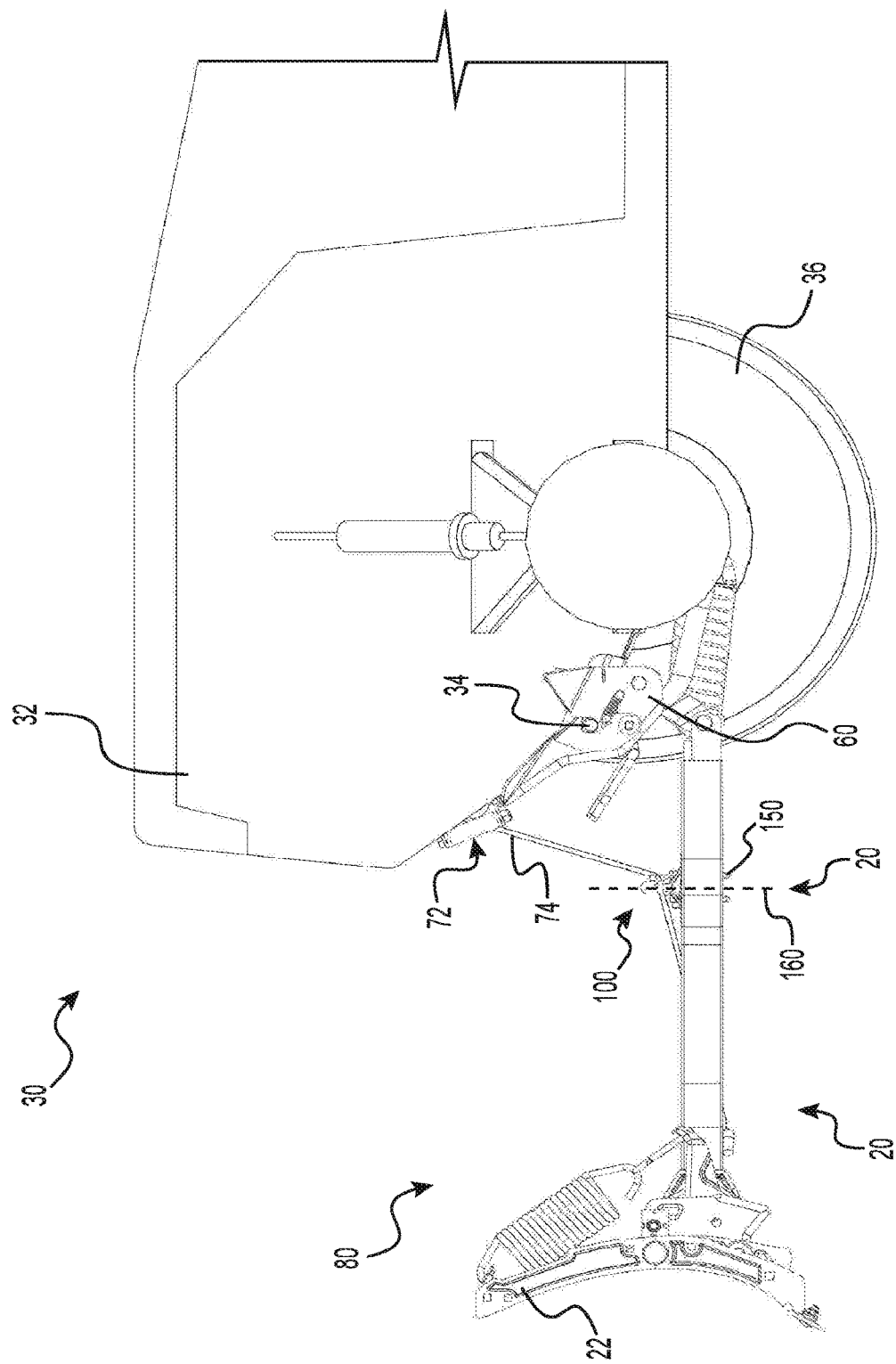
FIG. 13 is a left side elevation view of the implement mounting assembly of FIG. 12, with the implement mounting assembly mounted to the frame of the vehicle via the attachment system, and the cable still retained by the hook of the auto-release cable management assembly of the implement mounting assembly.
Figure 14:
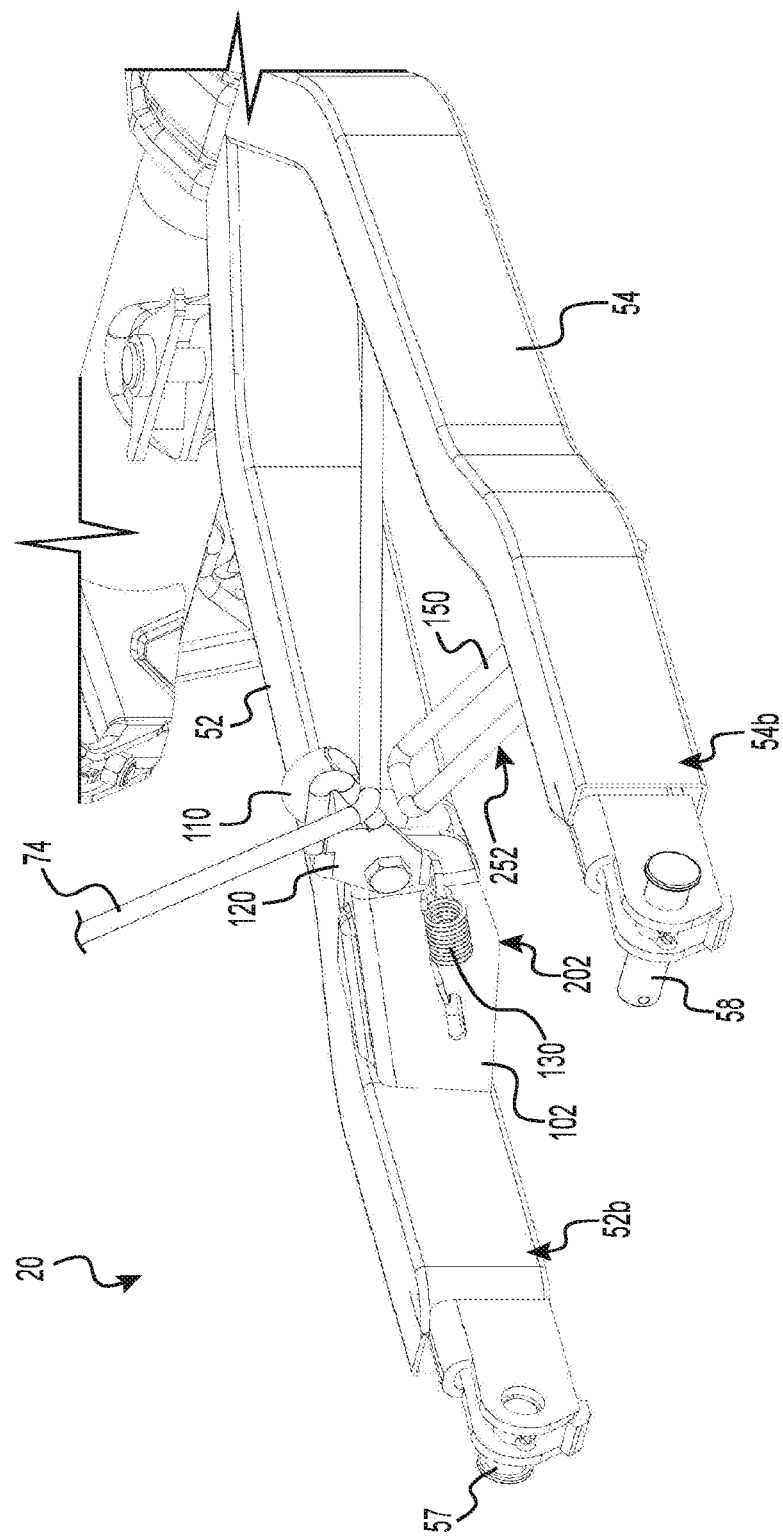
FIG. 14 is a perspective view taken from a top, rear, right side of the implement mounting assembly of FIG. 13, with the cable getting extended from the winch and being released from the hook by the gate of the auto-release cable management assembly of the implement mounting assembly.
Figure 15:
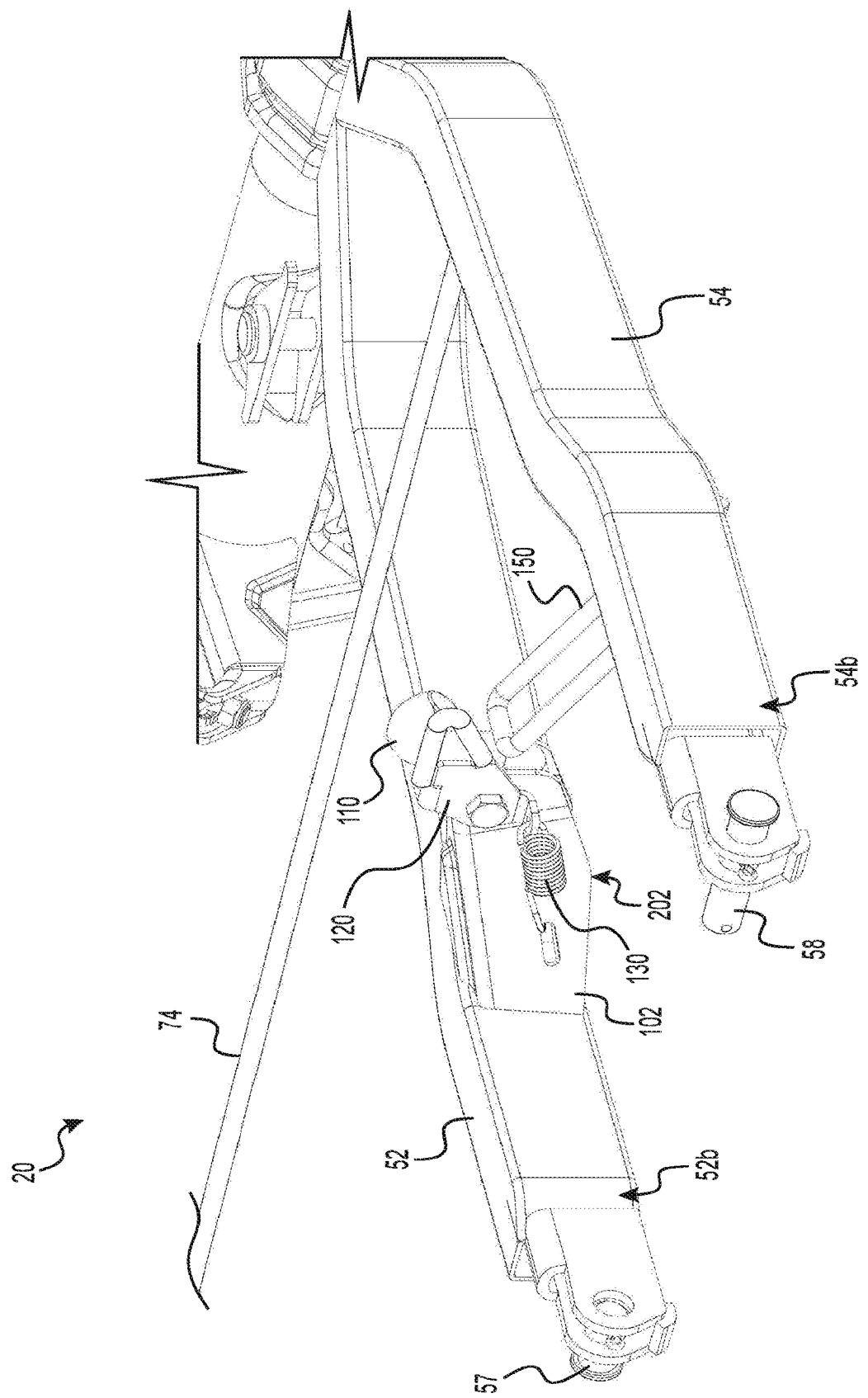
FIG. 15 is a perspective view taken from a top, rear, right side of the implement mounting assembly of FIG. 14, with the cable extending above the auto-release cable management assembly of the implement mounting assembly and still attached to the catch.

Referring to FIGS. 13 to 15, once the attachment assembly 60 is mounted to the frame 32 of the vehicle 30, the winch 72 is operated to extend the cable 74. As the tension in the cable 74 decreases below the threshold tension, the gate 120 is biased back in the closed position and releases the cable 74 from the hook 110 as the gate 120 pushes and slides the cable 74 off the hook 110. The cable 74 then extends above the auto-release cable management assembly 100.

Therefore, the implement mounting assembly 20 of the present technology permits a user to attach the cable 74 to a single attachment point (e.g., the catch 55) on the implement mounting assembly 20 for both mounting operations and for use of the assembly 80 of the work implement 22, implement mounting assembly 20 and attachment system 60.

Mounting Structure & Hook

Each component of the auto-release cable management assembly 100 will now be described in more detail. Referring to FIGS. 1 to 4 and 7, the mounting structure 102 is connected to the left longitudinal member 52. The connection between the mounting structure 102 and the left longitudinal member 52 is performed using suitable welding or bonding techniques. In another embodiment, the mounting structure 102 is integrally formed with the left longitudinal member 52.

The mounting structure 102 has a ridge 104 projecting from a top face 106 of the mounting structure 102. As seen in FIG. 4, the ridge 104 is triangularly shaped and is connected to the left longitudinal member 52. The mounting structure 102 extends upwardly from the left longitudinal member 52, and laterally towards the right longitudinal member 54. The mounting structure 102 has a free end 108 that is located about halfway between the left and right longitudinal members 52, 54, as best seen in FIG. 2. The hook 110 is connected to the free end 108. As best seen in FIG. 2, the hook 110 is laterally centered between the left and right longitudinal members 52, 54.

The underside guide surface 202 of the support structure 102 is shaped and positioned with respect to the hook 110 to guide the cable 74 within the cable routing space 70 such that, when the cable 74 is retracted by the winch 72 and contacts the underside guide surface 202, the cable 74 is guided towards the hook 110. More particularly, the underside guide surface 202 is inclined between the left longitudinal member 52 and the hook 110 as the mounting structure 102 projects upwardly and rightwardly of the left longitudinal member 52. As best seen in FIGS. 1 to 4, the hook 110 is located vertically higher than the underside guide surfaces 202 of the mounting structure 202. Referring to FIG. 4, the hook 110 faces downwardly and defines an arc of about 160 degrees. In addition and as seen in FIG. 5, the hook 110 is located longitudinally to the rear of the center of mass 90 of the implement mounting assembly 20.

Gate

Figure 7:
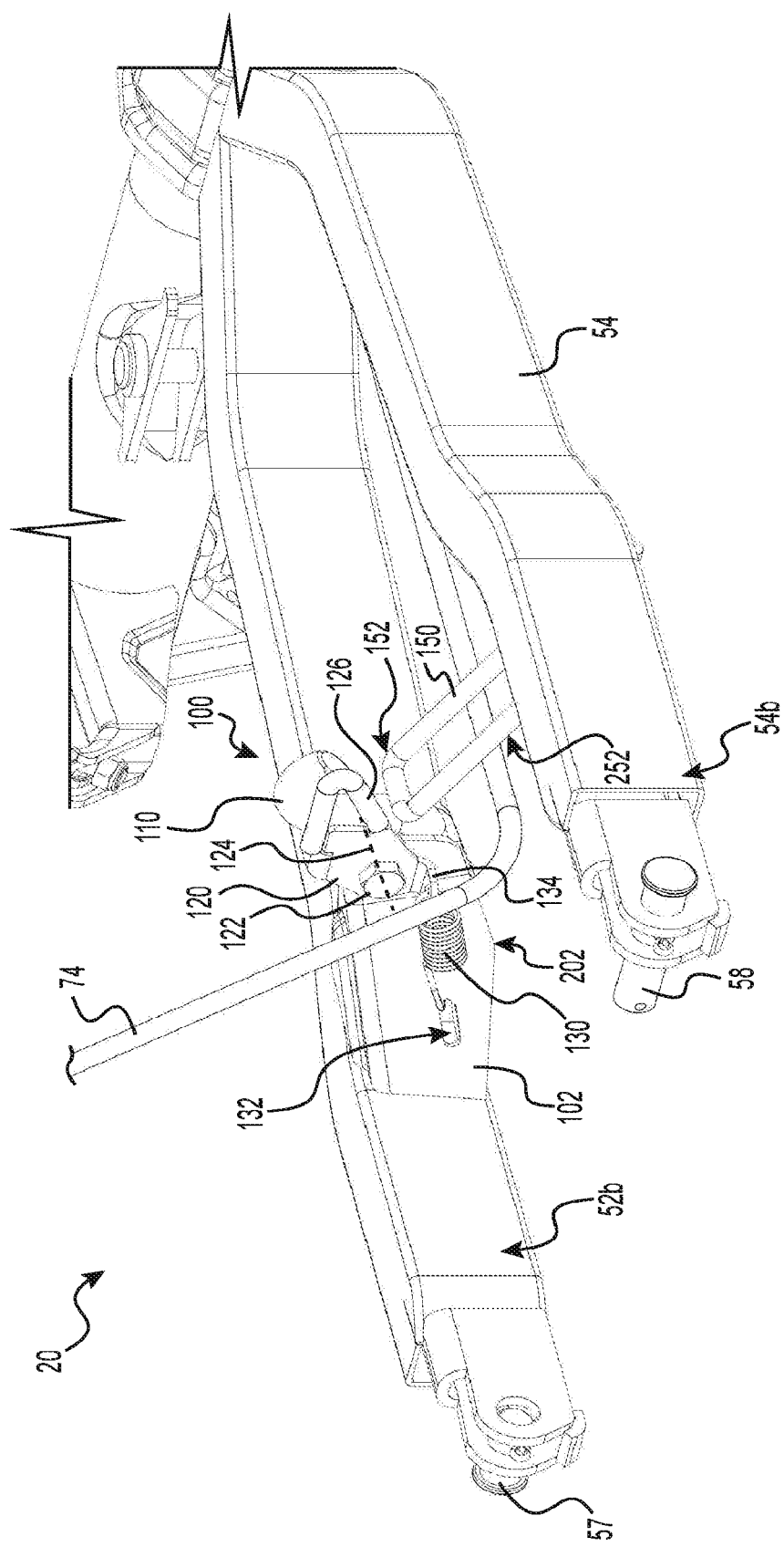
FIG. 7 is a perspective view taken from a top, rear, right side of the implement mounting assembly of FIG. 5, with the cable being loosely routed underneath an auto-release cable management assembly of the implement mounting assembly and attached to the catch of the implement mounting assembly.

Still referring to FIGS. 1 to 4 and 7, the gate 120 is used to control the presence of the cable 74 within the hook 110. The gate 120 is pivotably connected to the free end 108 of the mounting structure 102 via a bolt 122. The gate 120 pivots about a longitudinally extending axis 124 defined by the bolt 122 (FIGS. 2 and 7). The gate 120 is located longitudinally between the hook 110 and the vehicle attachment ends 52b, 54b. The gate 120 further includes a guide surface 126. The guide surface 126 is formed by a V-shaped rod. The guide surface 126 is structured and arranged to be pushed away by the cable 74 when the cable 74 has a tension that is above the threshold tension and accesses the hook 110 (FIG. 11). The guide surface 126 is also structured and arranged to slide and push the cable 74 out and away from the hook 110 when the cable 74 has a tension that is below the threshold tension (FIG. 14). Other shapes, structures and configurations of the guide surface 126 are contemplated in other embodiments.

Still referring to FIGS. 1 to 4 and 7, the spring 130 is operatively connected between the gate 120 and the mounting structure 102. More particularly, the spring 130 is interconnected between an aperture 132 defined in the mounting structure 102 and a tab 134 integrally formed in the gate 120 (FIG. 7). As a result, the gate 120 is spring-loaded. The tab 134 extends longitudinally rearwardly and below the pivot axis 122. As best seen in FIG. 4, a stop 140 is integrally formed in the gate 120. The stop 140 extends above the pivot axis 122 and longitudinally forward towards the mounting structure 102. The stop 140 limits the downward pivotal motion of the gate 120 caused by the spring 130 as the stop 140 abuts on the top face 106 of the mounting structure 102. The closed position of the gate 120 is shown in FIGS. 7, 14 and 15, and as mentioned above, the spring 130 biases the gate 120 into the closed position. It is contemplated that in another embodiment, the gate 120 could be operatively connected to the mounting structure 102 so as to be movable laterally, i.e. in a linear fashion, and still have a guide surface capable of pushing and sliding the cable 74 out and away from the hook 110.

Guide

Referring to FIGS. 1 to 4 and 7, the auto-release cable management assembly 100 further includes the guide 150 that is mounted to the right longitudinal member 54. The guide 150 is formed by a rod that is bent in a generally rectangular shape and that is made of a resilient material, such as steel. As previously mentioned, the guide 150 forms the underside guide surface 252 that guides the cable 74 toward the hook 110 and the gate 120 when the cable 74 is routed in the cable routing space 70 and is retracted by the winch 72.

In the present embodiment, the guide 150 is mounted to a bottom face of the right longitudinal member 54. The guide 150 extends upwardly from the bottom face of the right longitudinal member 54, and laterally toward the left longitudinal member 52. The underside guide surface 252 of the guide 150 is shaped and positioned with respect to the hook 110 to guide the cable 74 within the cable routing space 70 such that, when the cable 74 is retracted by the winch 72 and contacts the underside guide surface 252, the cable 74 is guided towards the hook 110. More particularly, the underside guide surface 252 is inclined between the right longitudinal member 54 and the hook 110 as the guide 150 projects upwardly and leftwardly of the right longitudinal member 54. As best seen in FIGS. 1 to 4, the hook 110 is located vertically higher than the underside guide surface 252 of the guide 150.

Still referring to FIGS. 1 to 4 and 7, the guide 150 has a free end 152 that is located about halfway between the left and right longitudinal members 52, 54, as best seen in FIG. 2. The hook 110 extends vertically above the free end 152. The hook 110 also laterally overlaps the free end 152 of the guide 150.

Figure 9:
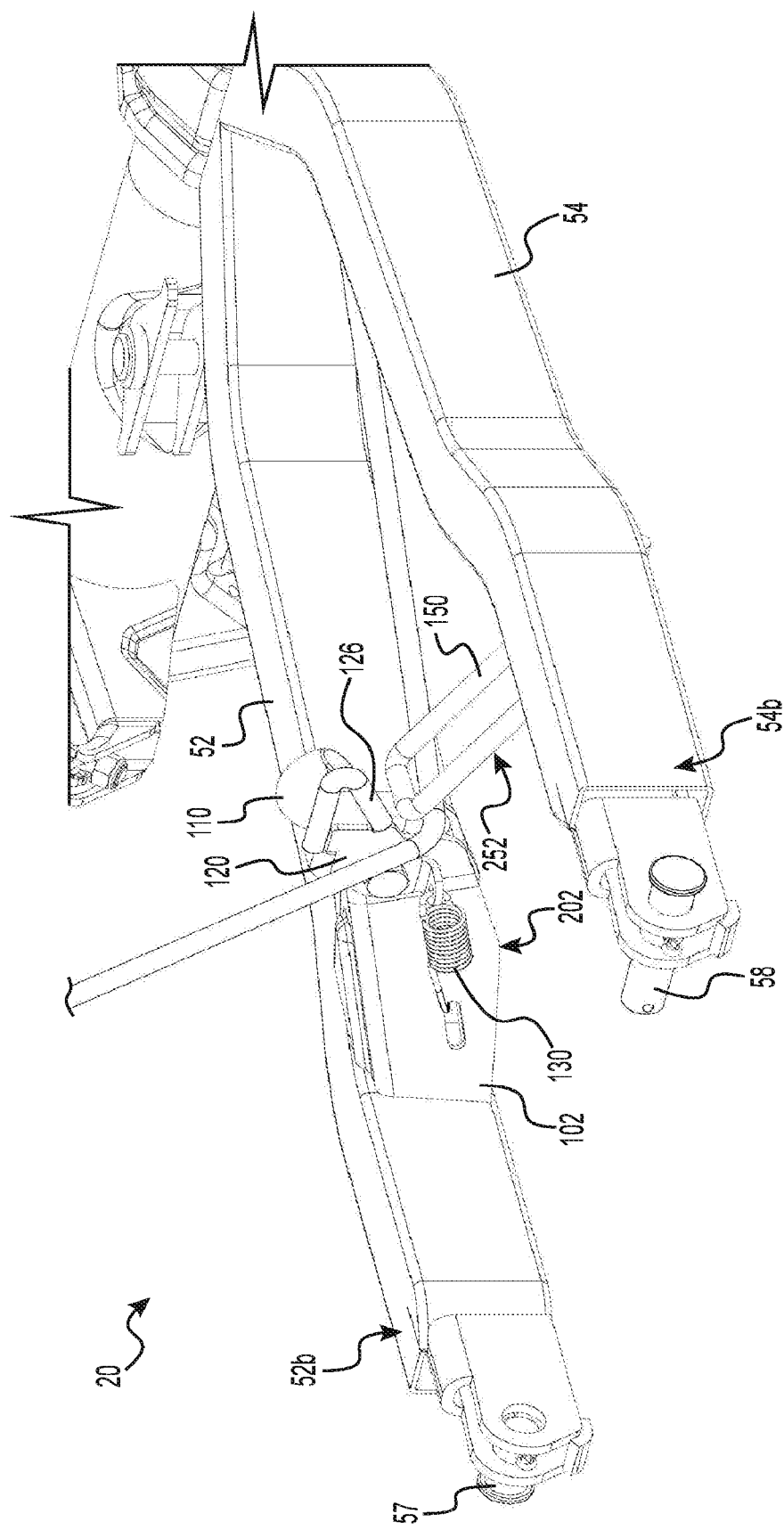
FIG. 9 is a perspective view taken from a top, rear, right side of the implement mounting assembly of FIG. 8, with the cable getting retracted by the winch and engaging the guide of the implement mounting assembly.

Referring to FIGS. 7 to 13, a vertically extending plane 160 (FIG. 13) includes the free end 152 of the guide 150 and the hook 110. When the cable 74 contacts the underside guide surface 252 as the cable 74 is retracted by the winch 72 and as tension increases in the cable 74, the cable 74 slides over the underside guide surface 252 and causes the guide 150 to resiliently deflect such that the free end 152 moves upwardly until the free end 152 abuts the guide surface 126 of the gate 120, and ultimately the hook 110. When tension in the cable 74 is further increased, the cable 74 continues sliding over the underside guide surface 252 toward the free end 152 (FIG. 9), and then slides past the free end 152, pushes against the guide surface 126 so as to move the gate 120 in the open position, and ultimately accesses the hook 110 (FIG. 10). Simultaneously to the cable 74 sliding past the free end 152 (FIG. 10), the guide 150 resiliently reverts to its rest position or close to its rest position, shown in FIGS. 7 and 11.

As best seen in FIGS. 1 to 4, the underside guide surfaces 202, 252 and the hook 110 laterally span the cable routing space 70 entirely. Referring to FIGS. 9 to 11, when the cable 74 is attached to the catch 55, is routed underneath the auto-release cable management assembly 100 and is retracted by the winch 72, the cable 74 is guided towards the hook 110 by at least one of the underside guide surfaces 202, 252. In other words, the cable 74 cannot bypass or circumvent the auto-release cable management assembly 100 entirely when routed within the cable routing space 70.

Referring to FIG. 11, when the guide 150 resiliently reverts to its rest position, a gap 162 appears between the hook 110 and the free end 152. When the cable 74 is released from the hook 110 by the gate 120, as shown in FIG. 14, the cable 74 passes through the gap 162 and then extends above the hook 110 of the auto-release cable management assembly 100 (FIG. 15).

Referring to FIGS. 15 to 17, after the cable 74 has passed through the gap 162 and extends above the hook 110, the cable 74 is still attached to the catch 55 and the winch 72 can be operated so as to raise the implement mounting assembly 20 and the work implement 22 in an "up" position (FIG. 17), or lower the implement mounting assembly 20 and the work implement 22 in a "down" position (FIG. 16).

Figure 18:
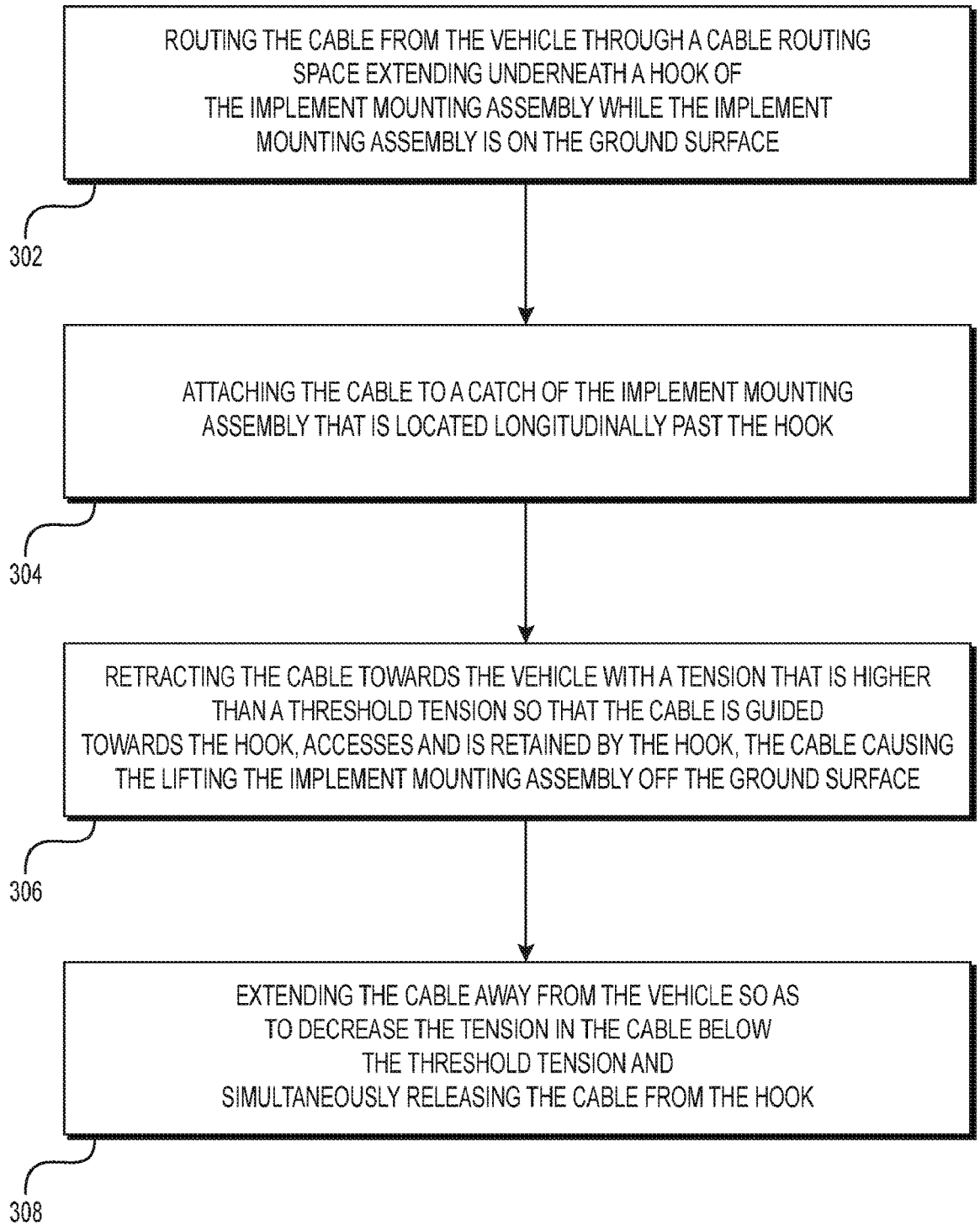
FIG. 18 is a flowchart of a method for managing a retractable cable used for mounting an implement mounting assembly to a vehicle from a ground surface, in accordance with an embodiment of the present technology.

Turning to FIG. 18 and in accordance with another aspect of the present technology, a flowchart illustrating an embodiment of a method 300 for managing a retractable cable used for mounting an implement mounting assembly to a vehicle from a ground surface is disclosed. The method 300 may be completely or partially implemented using the implement mounting assembly 20 and, as such, will be described with reference to the implement mounting assembly 20 described above.

The method 300 starts at a step 302 by routing the cable 74 from the vehicle 30 through the cable routing space 70 extending underneath the hook 110 of the implement mounting assembly 20 while the implement mounting assembly 20 is on the ground surface G.

Then, at a step 304, the method 300 proceeds to attaching the cable 74 to the catch 55 of the implement mounting assembly 20 that is located longitudinally past the hook 110.

At a step 306, the method 300 proceeds to retracting the cable 74 towards the vehicle 30 with a tension that is higher than a threshold tension so that the cable 74 is guided towards the hook 110, accesses and is retained by the hook 110. As the cable 74 is further retracted and is retained by the hook 110, the cable 74 causes the lifting of the implement mounting assembly 20 off the ground surface G. At this moment, the implement mounting assembly 20 can be mounted to the frame 32 of the vehicle 30 using the attachment assembly 60.

At a step 308, the method 300 proceeds to extending the cable 74 away from the vehicle 30 so as to decrease the tension in the cable 74 below the threshold tension and simultaneously releasing the cable 74 from the hook 110. After the step 308, the cable 74 can be retracted and extended to operate the implement mounting assembly 20 and the work implement 22 mounted thereto as needed.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. An auto-release cable management assembly for operating a work implement mountable to an implement mounting assembly of a vehicle, the auto-release cable management assembly comprising:
   a mounting structure connectable to the implement mounting assembly; the mounting structure forming a first underside guide surface for guiding a retractable cable operatively connectable to the vehicle;
   a hook connected to the mounting structure and suitable for retaining the retractable cable;
   a guide forming a second underside guide surface for guiding the retractable cable towards the hook and the gate; and
   a gate structured and positioned with respect to the hook to be movable between an open position in which the hook is accessible to the retractable cable, and a closed position in which the hook is inaccessible to the retractable cable, the gate forming a third underside surface for pushing and sliding the retractable cable off the hook.

2. The auto-release cable management assembly of claim 1, wherein the gate is pivotably mounted to the mounting structure.

3. The auto-release cable management assembly of claim 1, wherein the gate is biased towards the closed position.

4. The auto-release cable management assembly of claim 3, wherein the bias in the gate is provided by a resilient means.

5. The auto-release cable management assembly of claim 4, wherein the gate is spring-loaded.

6. The auto-release cable management assembly of claim 1, wherein the hook is located vertically higher than the first and second underside guide surfaces.

7. The auto-release cable management assembly of claim 6, wherein the first underside guide surface is inclined to guide the retractable cable to the hook.

8. The auto-release cable management assembly of claim 6, wherein the second underside guide surface is inclined to guide the retractable cable to the hook.

9. The auto-release cable management assembly of claim 1, wherein the hook faces downwardly and defines an arc of about 160 degrees.

10. The auto-release cable management assembly of claim 1, wherein the guide is resiliently movable when the retractable cable engages the second underside guide surface.

11. The auto-release cable management assembly of claim 1, wherein the guide has a free end extending below the hook, and the free end is movable for abutting on the hook when the retractable cable engages the second underside guide surface.

12. The auto-release cable management assembly of claim 11, wherein the free end of the guide is distanced from the hook when the retractable cable engages the hook or the first underside guide surface.

13. The auto-release cable management assembly of claim 1, wherein the mounting structure has a free end and the hook is connected to the free end.

14. The auto-release cable management assembly of claim 13, wherein the gate is pivotably connected to the free end of the mounting structure.

15. The auto-release cable management assembly of claim 1, wherein the third underside guide surface is structured and arranged to be pushed away by the retractable cable when the retractable cable has a tension that is above a threshold tension and accesses the hook.

16. The auto-release cable management assembly of claim 1, wherein the third underside guide surface is structured and arranged to slide and push the retractable cable out and away from the hook when the retractable cable has a tension that is below a threshold tension.

17. The auto-release cable management assembly of claim 1, wherein the implement mounting assembly comprises:
a frame having a work implement support end and a vehicle attachment end, the frame defining a cable routing space;
an attachment point to which the retractable cable extending through the cable routing space is attachable, the attachment point being connectable at the work implement support end of the frame;
wherein the auto-release cable management assembly is disposable longitudinally between the attachment point and the vehicle attachment ends of the frame.

18. The auto-release cable management assembly of claim 17, wherein the mounting structure extends upwardly from the frame.

* * * * *